United States Patent [19]

Lee

[11] 3,865,792

[45] Feb. 11, 1975

[54] COPOLYMERS AND TERPOLYMERS AND POLYAMIDE-POLYESTERS

[75] Inventor: Sung Ki Lee, Niagara Falls, N.Y.

[73] Assignee: Hooker Chemicals & Plastics Corporation, Niagara Falls, N.Y.

[22] Filed: Dec. 27, 1972

[21] Appl. No.: 319,077

Related U.S. Application Data

[62] Division of Ser. No. 90,817, Nov. 18, 1970, abandoned.

[52] U.S. Cl.................. 260/78 R, 260/3, 260/13, 260/22 R, 260/75 N, 260/75 EP, 260/77, 260/824 R, 260/829, 260/830 P, 260/835, 260/841, 260/849, 260/850, 260/857 R, 260/857 TW, 260/857 PE, 260/857 F, 260/857 UN, 260/857 L, 260/857 G, 260/857 D, 260/858

[51] Int. Cl............................................. C08g 20/00

[58] Field of Search........... 260/2 EN, 2 EP, 78.4 R, 260/78.4 EP, 80.73, 78 R

[56] References Cited
UNITED STATES PATENTS

| | | | |
|---|---|---|---|
| 2,272,489 | 2/1942 | Ulrich............................ | 260/2 EN |
| 3,313,736 | 4/1967 | Dickson et al.................. | 260/2 EN |
| 3,374,208 | 3/1968 | Seiner et al..................... | 260/78.4 |
| 3,772,229 | 10/1973 | Christena et al................ | 260/22 R |

*Primary Examiner*—John C. Bleutge
*Assistant Examiner*—J. Ziegler
*Attorney, Agent, or Firm*—Peter F. Casella; James F. Mudd

[57] ABSTRACT

Polyamide copolymers are prepared from alpha-beta ethylenically unsaturated monocarboxylic acids which are reacted with aziridine or derivatives thereof in the presence of a non-polar solvent. The polymers may be alternatively prepared from the half ester derivative of a dicarboxylic acid having alpha-beta ethylenic unsaturation. A continuous process for the preparation of the polyamide copolymers utilizes an anhydride of a dicarboxylic acid possessing ethylenic unsaturation between the alpha- and beta carbons. Continuous process produced polyamine-polyester polymers are made by combining the reactants as described above with the reactants required for the direct esterification of a polyester on a continuous basis namely, an alkylene oxide and an alkyl or aryl dicarboxylic acid anhydride, the reaction taking place in a heated closed zone on a continuous operation basis wherein the polyamide polyester product is formed continuously without the production of the usual water of esterification. The halogenated polymers are useful as fire retardant additives in normally combustable plastics, fire retardant and anti-static agents for films and fibers such as polyesters and polyamides, and the unsaturated polymers are useful as intermediates which can be crosslinked with vinyl monomers such as styrene.

6 Claims, No Drawings

COPOLYMERS AND TERPOLYMERS AND POLYAMIDE-POLYESTERS

This is a division of application Ser. No. 90,817, filed Nov. 18, 1970 and now abandoned.

BACKGROUND OF THE INVENTION

1. Field of the Invention

This invention concerns novel polyamide copolymers or polyamide-polyesters and their method of preparation. More particularly, the present invention relates to aziridine derived polyamide copolymers formed by an addition reaction taking place in a non-polar or low dielectric constant solvent. The addition can utilize anhydrides having ethylenic saturation at the alpha-beta carbon position in addition to mono- and dicarboxylic acids or anhydrides having ethylenic unsaturation at the alpha-beta carbon position. In addition, the invention relates to modified polyamide resin copolymers by the co-reaction with a third monomer to produce a polyester by a process in which no water of esterification is formed. Such a process utilizes in addition to aziridine an alkylene oxide or substituted equivalent thereof and a dicarboxylic acid anhydride or substituted equivalent thereof.

2. Description of the Prior Art

Polymerization of aziridine (ethylene imine) or its derivatives to give polyalkylene amine is well-known. Such polymerization takes place in the presence of a polar solvent. Polymerization of acrylic acid or its derivatives is also well-known, the homopolymerization requires the presence of a catalyst. The monomeric reaction product of methacrylic acid, acid chloride and aziridine is described in U.S. Pat. No. 2,830,045. This monomer may be polymerized by further reaction with thioglycolic acid to a yellowish colored rubber-like resin which is insoluble in most solvents. The reaction product of acrylic acid and aziridine as described in the above patent is formed by the reaction components without splitting or cleavage of the aziridine ring. The ring opening of anhydrides by primary or secondary and even with tertially amines to give amic acid is well-known.

SUMMARY OF THE INVENTION

According to the present invention, it has now been found that aziridine alone or its derivatives or aziridine together with an alkylene oxide may be polymerized in a nonpolar solvent with an alpha-beta ethylenically unsaturated monocarboxylic acid, an amic acid, or an alpha-beta ethylenically unsaturated dicarboxylic acid or its half ester or anhydride or an $\alpha,\beta$-ethylenically unsaturated aryl dicarboxylic acid or anhydride. The invention provides a process for the manufacture of the above addition reaction products and contemplates the continuous polymerization of such products alone or in combination with polyesters produced by the reaction of the anhydride of an alkyl or aryl dicarboxylic acid and an alkylene glycol and or alkylene oxide. Examples of representative starting materials are shown below:

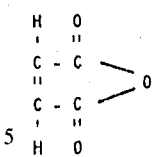 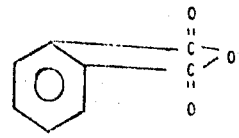

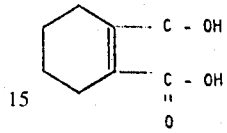 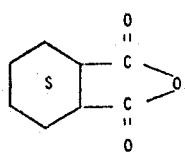

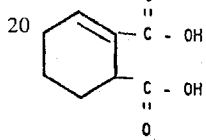

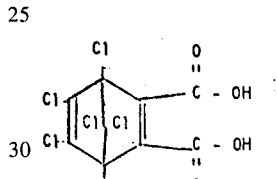 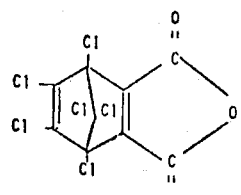

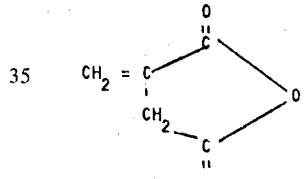 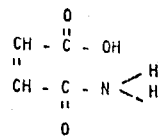

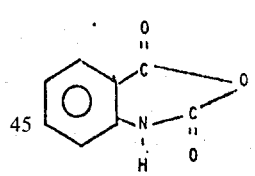 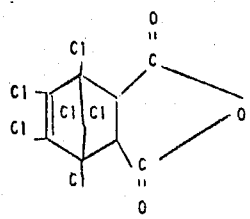

Examples of copolymers and terpolymers are as follows:

1. Copolymer:

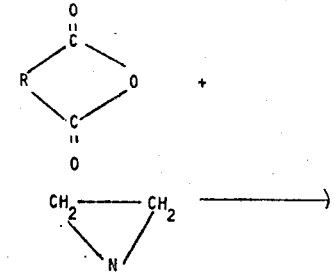

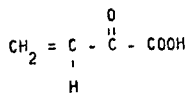 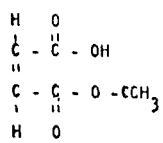 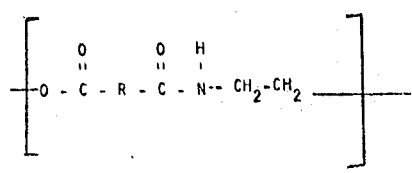

2. Terpolymers:

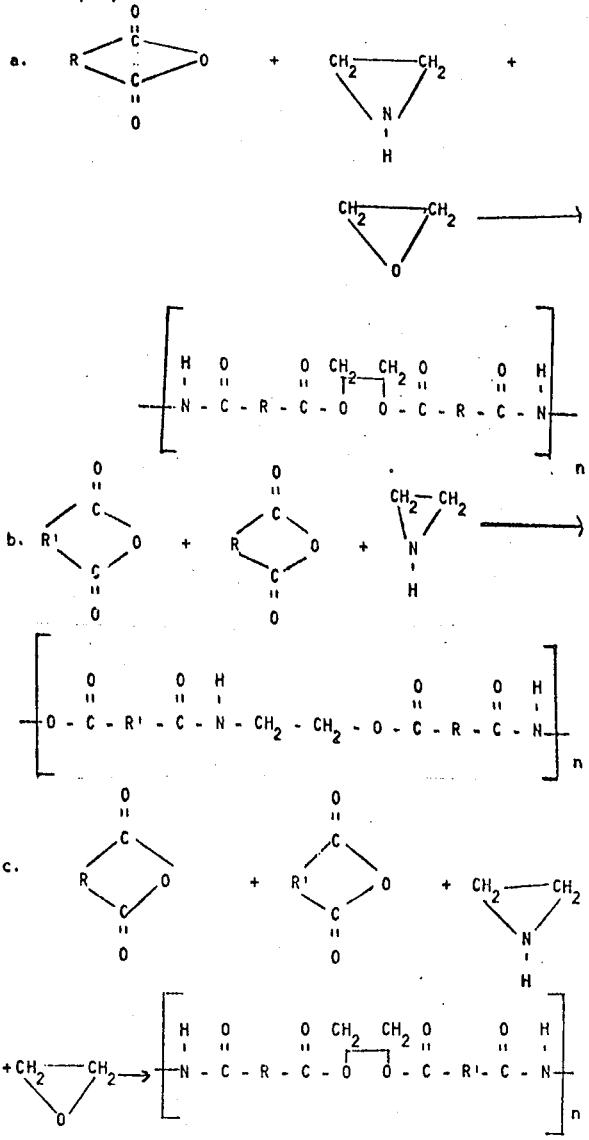

where R and R' are independently selected from divalent radicals consisting of saturated and unsaturated aromatic, alicyclic, bicyclic and heterocyclic groups and may be the same or different.

Generally reaction is contemplated of an aziridine monomer or an azetidine monomer or an aziridine monomer and an organic compound of the formula below or an azetidine monomer and an organic compound of the formula:

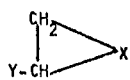

where Y is hydrogen or a monovalent, saturated or unsaturated, alkylene, aromatic, bicyclic, or heterocyclic group of 1 to 18 carbon atoms, where X is oxygen, sulfur or phosphorus; or azetidine and said organic compound and monomers selected from the group consisting of:

(A)
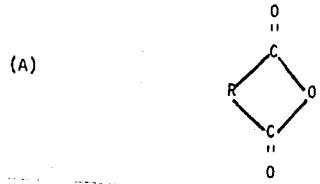

(B)
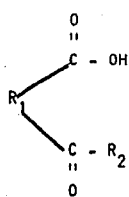

where R is a saturated or unsaturated aromatic or alicyclic of 6–18 carbon atoms, aliphatic of 2–18 carbon atoms, or bicyclic of 7–18 carbon atoms divalent group, and 0–6 halogen atoms; and where $R_1$ is $\alpha\beta$-unsaturated aromatic, aliphatic, alicyclic, or bicyclic divalent groups of 2–20 carbon atoms and 0–6 halogen atoms; if aromatic or alicyclic, 6–18 carbon atoms; if aliphatic 2–18 carbon atoms; if bicylic 7–18 carbon atoms; and where $R_2$ is $-OR_3$, $-N(R_3)_2$, and where $R_3$ is H or monovalent alkyl of from 1–18 carbon atoms and 0–6 halogen atoms and (c)   $R_4 - \overset{O}{\underset{\|}{C}} - OH$ an organic monocarboxylic acid having $\alpha\beta$-unsaturation where $R_4$ is selected from monovalent alkyl of 1–18 carbon atoms and aromatic radicals of 6–18 carbon atoms such as the monovalent group consisting of:

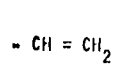 , 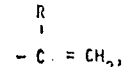

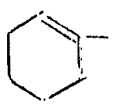 , 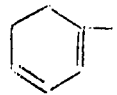

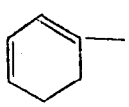 , 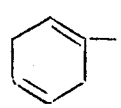

and contains 0–6 halogen atoms and where R is a saturated or unsaturated aromatic or alicyclic of 6–18 carbon atoms, aliphatic of 2–18 carbon atoms, or bicyclic of 7–18 carbon atoms monovalent group and 0–16 halogen atoms.

Said acid, anhydride, or ester group members may contain halogen atoms selected from the group consisting of chlorine and bromine.

Reactions in non-polar solvents of inorganic acids such as phosphoric and boric are also possible with aziridine, or equivalents thereof as described above, which results in splitting of the aziridine ring and the formation of polymer chains as illustrated by the following example of the reaction with phosphoric acid:

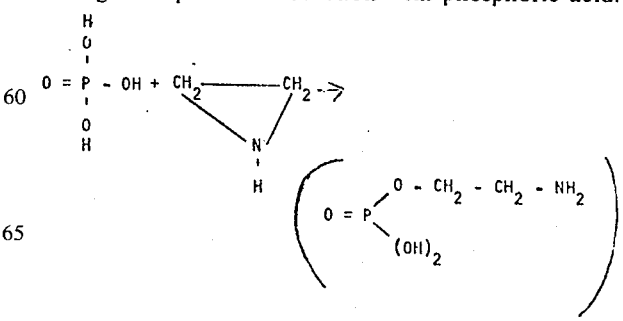

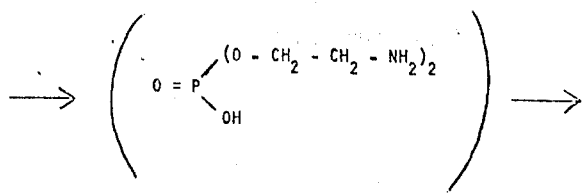

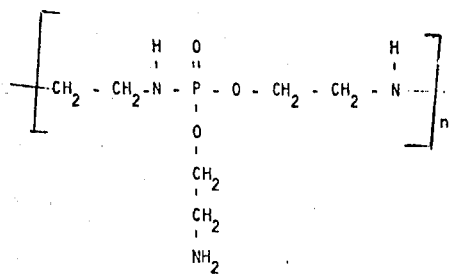

Both boric acid and phosphoric acid have been found to react to form polymer chains. Any acid of the formula:

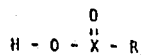

where X is carbon, phosphorus, boron, silicon, or nitrogen; and
where R is hydrogen, methyl, ethyl, propyl, etc.
will react with aziridine in the same manner.

The reaction is advantageously carried out in the presence of an organic solvent of a non-polar or non-protonic type having good solubility parameters for the reactants which acts to slow down the reaction which takes place more vigorously when a polar solvent is used as a reaction medium and which takes place with extreme violence when the two reaction components are mixed in bulk.

It has been found that the mode of the reaction and the structures of the polymers produced are greatly dependent on the dielectric constant of the reaction medium employed as well as the steric requirements for the polymer formation. The copolymer of acrylic acid and aziridine produced in a solvent such as dioxane is a non-hygroscopic, white, solid material which is soluble in water but insoluble in most common organic solvents.

A desirable objective of the present invention is to provide high molecular weight copolymers which can be obtained by reaction of the components at room temperature without catalysts. High molecular weight polyamide type copolymers may be obtained by reaction on a continuous basis without the production of by-product water and without catalysts. The production of high molecular weight polyamidepolyester mixed copolymers may be achieved on a continuous basis without the production of by-product water by the use of reaction components consisting of azetidine or aziridine or its substituted derivatives and ethylenically unsaturated dicarboxylic acids or anhydrides which are reacted in the presence of alkylene oxide or substituted derivatives thereof. The molecular weight of the polymers can vary between 2,000–300,000. Those derived from the reaction with unsaturated dicarboxylic acids or anhydrides can have a molecular weight varying between 2,000–6,000, corresponding to a degree of polymerization between 3–5. Those polymers derived from the reaction with $\alpha\beta$-ethylenically unsaturated mono-carboxylic acids can have a molecular weight varying between 30,000–300,000 corresponding to a degree of polymerization between 30–300.

The new polymers are useful for various purposes such as in the treatment of paper and textiles as well as in the field of plastics or in sewage flocculation because of their polyelectrolytic nature. The new polymers derived from a halogen containing monomer are useful as polymer additives for fire retardancy and other physical property modifiers. They are also useful in fiber and film-forming resins. The mixed polyamide-polyester blend copolymers produced on a continuous basis in accordance with the teachings of this invention are useful in providing improved unsaturated polyester compositions showing increased strength after curing with a reactive vinyl monomer such as styrene as a result of the built-in crystallization tendency of the polyamide portion of the polymer.

The low molecular weight polyesteramide polymers of the invention are useful as polymeric plasticizers for such polymers as polyvinyl chloride and as an aid in the preparation of blends of polyvinyl chloride with such polymers as the terpolymer of polybutadiene with acrylonitrile and styrene, nitrile rubber, nylon, and styrene-butadiene rubber. Incorporation of the polymers of the invention acts to increase the compatibility of the polymer blend.

The unsaturated polyester amide polymers may be cured by crosslinking with vinyl monomers such as styrene or styrene methyl methacrylate where the polymers have the required solubility in the vinyl monomers. Increased solubility in vinyl monomers may be provided by substituting for a portion of the aziridine compound, an organic oxide such as ethylene or propylene oxide. The saturated polyesteramide polymers may be cured by conventional reaction of the amine portion of the polymer molecule with formaldehyde or formaldehyde containing materials.

DETAILED DESCRIPTION OF THE INVENTION

In the preparation of the polyamide polyester copolymers by either batch or continuous reaction of aziridine and a saturated or unsaturated alkylene oxide such as with a carboxylic acid or anhydride, the $\alpha\beta$-ethylenically unsaturated dicarboxylic acids or anhydrides comprise: maleic acid and anhydride, succinic anhydride, itaconic acid and anhydride, furmaric acid, sebacic acid, and adipic acid. Cyclic dicarboxylic acids or anhydrides comprise: phthalic acid and anhydride, isophthalic acid, amic acid and chlorendic anhydride. Appropriate monocarboxylic acids having from 3–18 carbon atoms are useful in the reaction and comprise acrylic acid, methacrylic acid, linoleic acid, linolenic acid, and others.

Solvents having dielectric constants within the range of 0 to 10, or non-protonic solvents, can be employed as reaction media such as dioxane, xylene, toluene, benzene, and tetrahydrofuran.

Various alkylenimines and substituted alkylenimines can be used. These correspond generally to the formula:

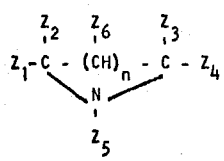

where $Z_1$, $Z_2$, $Z_3$, and $Z_4$ are each either hydrogen; alkyl, such as methyl, ethyl, propyl, or the like, having, for example, up to about 20 carbon atoms; aryl, such as phenyl or the like; alkaryl, such as tolyl, xylyl or the like; or aralkyl, such as benzyl, phenethyl or the like. $Z_5$ or $Z_6$ in the above formula is hydrogen or a lower alkyl radical usually having not more than about 4 carbon atoms, and n is an integer from 0 to 1. The above aromatic groups have 6–18 carbon atoms.

It is intended that the groups designated by the above formula include substituted radicals of the classes indicated, including substituents such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, one and usually several of the groups designated by $Z_1$ through $Z_6$ will represent hydrogen. However, the efficacy of the various imines within the above formula does not depend upon the particular nature of any of the substituents and thus, beneficial results are obtained with any of those compounds within the above class.

To exemplify the nature of the materials which fall within the scope of the formula set forth above, a number of specific alkylenimines are as follows:

Ethylenimine (aziridine)
1,2-propylenimine (2-methyl aziridine)
1,2-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methylpropylenimine (3-methyl azetidine)
3-chloropropyl ethylenimine (2-(3-chloropropyl)aziridine)
p-Chlorophenyl ethylenimine (2-(4-chlorophenyl)aziridine)
Methoxyethyl ethylenimine (2-(2-methoxyethyl)aziridine)
Dodecyl aziridinyl formate (dodecyl 1-aziridinyl carboxylate)
Carbethoxyethyl ethylenimine (2-(2-carbethoxyethyl)aziridine)

Because of their availability and because they have been found to be among the most effective, the preferred imines are alkylenimines having 2 to 4 carbon atoms, and especially ethylenimine(aziridine) and 1,2-propylenimine (azetidine).

Cyclic ethers such as oxetanes are useful when making blend copolymers of the polyamide copolymers together with polyesters. These can have oxygen located in a heterocyclic ring of four members such as trimethylene oxide, 3,3-dimethyl trimethylene oxide and 3,3-bischloromethyl trimethylene oxide. Mixtures of such compounds with epoxides are also useful as reactants. Preferred for use are oxetanes and substituted oxetanes having from 3 to 6 carbon atoms and from 0 to 6 halogen substituents selected from the group consisting of chloro and bromo radicals.

The most preferred cyclic ethers for use in the preparation of the copolymers of this invention are epoxides such as propylene oxide and ethylene oxide because of their ready availability, high reactivity and the very desirable properties of the polyamide-polyester composition resulting therefrom. For many uses the most preferred cyclic ether is propylene oxide. Epoxides having 3–6 carbon atoms and from 0–6 halogen substituents selected from the group consisting of chloro and bromo radicals are preferred. Other examples of epoxides that can be employed are: butylene oxide, cyclohexane oxide, epichlorohydrin, styrene oxide, allyl glycidyl ether, methyl glycidyl ether, butyl glycidyl sulfide, glycidyl methyl sulfone, glycidyl methacrylate, glycidyl allyl phthalate, and the like.

The cyclic monoanhydrides useful in the process can be aromatic, saturated or partially saturated aliphatic, cycloaliphatic, aromatic, and bicyclic anhydrides. Such anhydrides have from 4–20 carbon atoms and from 0 to 6 halogen substituents and have the general formula:

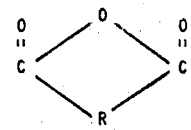

wherein R is a saturated or unsaturated, aromatic or alicyclic of 6 to 18 carbon atoms, aliphatic of 2 to 18 carbon atoms, or bicyclic of 7 to 18 carbon atoms divalent group and from 0 to 6 halogen substituents selected from the group consisting of chloro and bromo radicals. Particularly preferred are cyclic monoanhydrides derived from 1,2-dicarboxylic acids having from 4 to 12 carbon atoms and from 0 to 6 halogen substituents. Those anhydrides which are presently particularly preferred in the process are phthalic anhydride, 3, 4, 5, 6-tetrachlorophthalic anhydride, 3, 4, 5, 6-tetrabromophthalic anhydride, tetrahydrophthalic anhydride, maleic anhydride, dichloromaleic anhydride, succinic anhydride, itaconic anhydride and 1, 4, 5, 6, 7, 7-hexachlorobicyclo-(2.2.1)-5-heptene-2,3-dicarboxylic acid anhydride, hereinafter called chlorendic anhydride, hexahydrophthalic anhydride, tetrahydrophthalic anhydride, and tetrachlorophthalic anhydride.

The most preferred anhydrides are phthalic anhydride, maleic anhydride and succinic anhydride because of their ready availability and the widely useful compositions produced therefrom.

The reaction of the alpha-beta ethylenically unsaturated monocarboxylic acid with the aziridine may be effected by dissolving the materials in a non-polar solvent such as dioxane and adding the ethylene imine dropwise at such a rate that the exothermic reaction does not produce a temperature in excess of 70°C. The reaction mixture should be continuously stirred over a period of 1.5–4 hours. A polymer is produced which is a white solid at room temperature having a molecular weight in the range 100,000–300,000.

The $\alpha,\beta$-unsaturated dicarboxylic acids useful in the process can be maleic acid, itaconic acid, fumaric acid, sebacic acid, adipic acid and the like. Monocarboxylic acids having $\alpha,\beta$ ethylenic unsaturation comprise acids having 3 to 18 carbon atoms such as acrylic acid, methacrylic acid, linoleic acid, linolenic acid and the like. Cyclic dicarboxylic acids having $\alpha,\beta$-ethylenic unsaturation comprise: phthalic acid, isophthalic acid, amic acid and the like.

The reaction of $\alpha\beta$-unsaturated dicarboxylic acids or saturated dicarboxylic acid anhydrides with aziridine type monomers may be effected by dissolving or suspending the acid or anhydride in a non-polar solvent and slowly adding an aziridine solution in a non-polar solvent at such a rate that the reaction temperature does exceed 20°–30°C. After all ingredients have been combined (2-3 hours) the mixture is stirred further for 2-3 hours in a nitrogen atmosphere at 30°–60°C. The solution is then poured into a non-solvent for the polymer such as water or an aliphatic hydrocarbon, filtered and dried in vacuum at 50°C.

Generally the reaction is mostly exothermic, requires cooling with ice water, does not require a catalyst, and is complete as soon as all the reactants have been added. Quantitative yields of polymer are obtained having a number average molecular weight in the range of 2,000 to about 4,000, a glass transition temperature in the range of 150°–200°C., and a 300°–400°C. decomposition temperature.

Proportions of reactants are selected to provide a ratio of substantially equal molar amounts where a copolymer is produced from the reaction of the previously defined organic acid or anhydride with the previously defined aziridine type compound. Where a terpolymer is produced by the reaction of an alkylene oxide together with the monomers described above, the proportions of reactants may be widely varied and yet allow complete reaction to take place at available reaction sites. Thus in the preparation of terpolymers, the particular organic acid, organic acid anhydride, or mixtures thereof may be present in the molar ratio of 5–50 parts to 95–50 parts of a mixture of alkylene oxide and aziridine with a minimum of 1 part of aziridine compound required to be present.

The order of addition of the monomers may also be varied so that if desired, the polymer will contain reactive groups derived from the particular monomers used. Thus a portion of a monomer or monomers may be held out of the reaction mixture until the already added components have reacted completely; the addition of a portion of the monomer or monomers at the end serving to provide reactive sites attached to the polymer corresponding to those present in the monomer or monomers added.

Half esters of the above described $\alpha\beta$-unsaturated dicarboxylic acids can also be used in practicing the invention. These can be mono alkyl esters and contain from 1–18 carbon atoms in the alkyl groups and can be represented by the group:

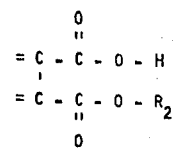

wherein $R_2$ is $-OR_2$, $-N(R_3)_2$, and where $R_3$ is H or a monovalent alkyl groups of from 1-18 carbon atoms such as methyl or stearyl.

Preferably $R_2$ is an unsubstituted alkyl group of from 4–8 carbon atoms such as n-butyl, n-hexyl, n-octyl, and 2-ethyl-hexyl. Half esters of the above described $\alpha\beta$unsaturated dicarboxylic acids used in practicing the invention can be mono esters such as maleamic acid, (maleic acid monoamide) or alkyl derivatives substituted on the nitrogen having 4–8 carbon atoms such as n-butyl, n-hexyl, n-octyl, and 2-ethyl hexyl.

The reaction of an alpha-beta ethylenically unsaturated dicarboxylic acid (maleic acid) with aziridine is effected as follows:

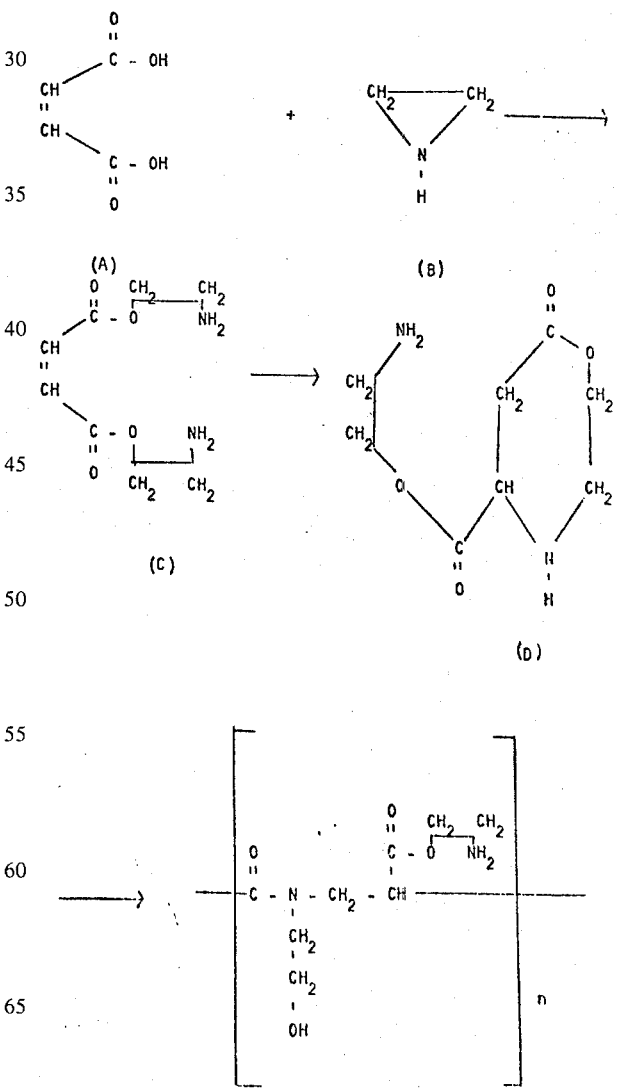

Monomers A and B yield difunctional monomer C which undergoes intramolecular as well as intermolecular addition to yield monomer D which rearranges by transamidation to give a polymer with repeating unit as shown.

The reaction of aziridine with phthalic anhydride in combination with ethylene oxide to produce a combination of a polyamide and a polyester copolymer is effected as follows:

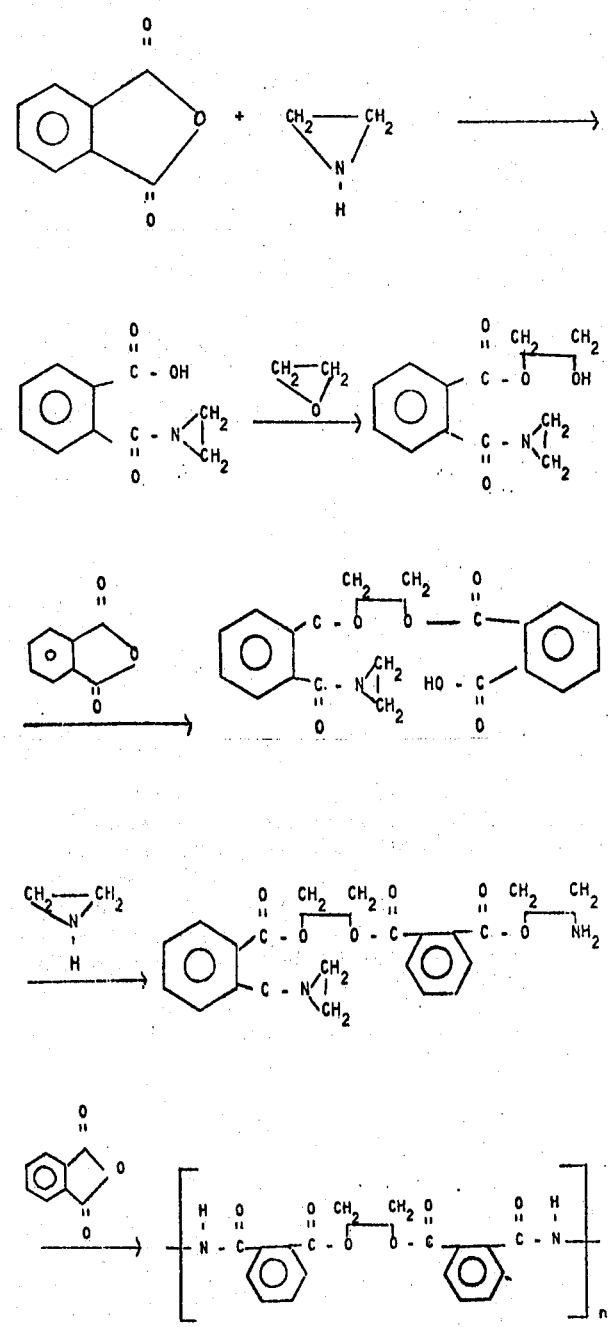

The halogenated polymers as described are suitable for reducing the inflammability of most high polymerized materials. Their use is especially effective in materials which have been produced by the polymerization of unsaturated compounds, especially of olefins such as ethylene, propylene, and styrene, and copolymers thereof. The additives are also useful in combination with terpolymers of butadiene with acrylonitrile and styrene and cross-linked butadiene-styrene polymers. In addition, natural and synthetic rubber compounds can be rendered effectively flameproof in this manner.

The molding compounds rendered flameproof according to the invention can contain conventional additives customarily used in polymer chemistry such as plasticizers, lubricants, fillers, heat and light stabilizers etc. If desired, the fire retardant agent to be used according to the invention can be combined with other fire retardant agents such as chloroparaffins.

The additives used according to the invention have, in comparison with chlorinated aliphatic hydrocarbons and organic acid esters of halogenated phenols and other such substances, the advantage of improved temperature stability so that HCl evolution is reduced during processing of the plastic. Therefore, improvements can be expected in this regard when the substances of the invention are used as compared to chlorinated aliphatic hydrocarbons even when the manufacturing is done at a relatively high temperature.

The polymeric compositions and coatings of this invention include high molecular weight thermosetting and thermoplastic polymers and resins as well as the intermediate molecular weight materials utilized for coatings and paints. The polymers embraced within the scope of this invention include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene or with other olefins, polybutadiene; polymers of butadiene, polyisoprene, both natural and synthetic, polystyrene including high impact polystyrene, and polymers of pentene, hexane, heptene, octene, 2-methylpropene, 4-methyl-hexene-1, bicyclo-(2.2.1)-2-heptene, pentadiene, hexadiene, 2,3-dimethylbutadiene-1,3,4-vinylcyclohexene, cyclopentadiene, methylstyrene, and the like. Other polymers useful in the invention include polyhalogenated hydrocarbon polymers, including fluoro polymers such as polytetrafluoroethylene; polysilicon and polyhalogenated silicons; polyindene, indenecoumarone resins; polymers or acrylate esters and polymers of methacrylate esters, acrylate and methacrylate resins such as ethyl acrylate, n-butyl methacrylate, isobutyl methacrylate, ethyl methacrylate and methyl methacrylate; alkyl resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins, furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleo resins; phenolic resins such as phenol-formaldehyde, phenolic-elastomer, phenolicepoxy, phenolic-polyamide, and phenolic-vinyl acetals; polyamide polyers, such as polyamides, polyamide-epoxy and particularly long chain synthetic polymeric amides containing recurring carbonamide groups as an integral part of the main polymers chain; polyacryl amies; polysulfones; polyester resins such as unsaturated polyesters of dibasic acids and dehydroxy compounds, and polyester elastomers and resorcinol resins such as resorcinol-formaldehyde, resorcinol-furfunal, resorcinol-phenolformaldehyde, resorcinol-polyamide and resorcinol-urea; rubbers such as natural rubber, silicone rubber, synthetic polyisoprene, reclaimed rubber, chlorinated rubber, polybutadiene, cyclized rubber, butadiene-acrylonitrile rubber, butadiene-styrene rubber, and butyl rubber, neoprene rubber (polychloroprene); polysulfides (Thiokol); terpene resins, urea resins; vinyl resins such as polymers of vinyl acetal, vinyl acetate or vinyl alcohol-acetate copolymers, vinyl alcohol, vinyl chloride, vinyl butyral, vinyl chloride-acetate copolymer, vinyl pyrrolidone and vinyldene chloride copolymer; polyformaldehyde; polyethers, such as polyphenylene oxide, polymers of diallyl phthalates and phthalates; polycarbonates of phosgene or thiophosgene and dihydroxy compounds such as bisphenols, thermoplastic polymers of bisphenols and epichlorohydrin (tradename Phenoxy polymers); graft copolymers and polymers of unsaturated hydrocarbons and an unsaturated monomer, such as graft copolymers or polybutadiene, styrene and acrylonitrile, commonly called ABS resins; copolymers or mixtures of polybutadiene and styrene known as high impact polystyrene; ABS-polyvinyl chloride polymers; acrylic polyvinyl chloride polymers; and any other suitable natural and synthetic polymers.

The polymers of the invention can be in various physical forms such as shaped articles, for example, moldings, sheets, rode, and the like; fibers, coatings, films and fabrics, and the like.

The following Examples are solely for purposes of illustration of certain embodiments of this invention and accordingly are not intended to limit this invention. In this specification and claims, all parts are by weight, and temperatures are given in degrees centigrade unless otherwise stated.

EXAMPLE 1

One mole of methacrylic acid was dissolved in 600 milliliters of dioxane in a suitable reaction flask. To this mixture one mole of ethylene imine (aziridine) was added dropwise at such a rate that the reaction temperature does not exceed 40° C. The reaction mixture was continuously stirred at 25°C. for hours to give a white solid copolymer which was extracted with dioxane ether mixture in order to purify it. The intrinsic viscosity was found to be 1.9 to 2.0 as measured by viscometry. This corresponds to a molecular weight of about 400,000 to 600,000. The polymer was found to be water soluble to the extent of 5 to 10 grams per 100 cc of water.

EXAMPLE 2

One mole of phthalic anhydride was added to 1,000 milliliters of dioxane in a suitable reaction flask. To this mixture was added one mole of ethylene imine incrementally so as to control the reaction temperature obtained in this exothermic reaction so as to prevent the temperature from exceeding 25°C. The reaction mixture was continuously stirred 1.5 hours to give a white solid copolymer which was soluble in methanol but insoluble in water. The molecular weight of the polymer obtained was 100,000 to 300,000.

EXAMPLE 3

One mole of maleic anhydride and one mole of ethylene imine were reacted in the same manner as in Example 2 and a mixture of an oil and a white solid polymer was obtained.

EXAMPLE 4

One mole each of chlorendic anhydride and ethylene imine were reacted in the same manner as in Example 2 to give a polymer having a molecular weight of 2070 as determined by the vapor pressure method.

EXAMPLE 5

One mole of phthalic anhydride was combined with one-half mole of ethylene imine and one-half mole of ethylene oxide in a suitable reaction flask equipped with gas inlet. While ethylene imine was reacting, one-half mole of ethylene oxide was bubbled into the reaction mixture. Other then this the reaction was carried out essentially the same as the foregoing steps as described in Examples 1–4. This process can also be employed in the production of mixed resins composed of the reaction products of polyamide resins and polyester resins wherein various other monocarboxylic acids, dicarboxylic acids, half esters of dicarboxylic acids or the anhydrides of dicarboxylic acids other than as shown are used. Also ethylene oxide could be replaced by various other epoxides such as are herein disclosed.

EXAMPLE 6

One half mole each of tetrachlorophthalic anhydride & ethylene imine were reacted in the same manner as Example 2 to give a solid polymer having 36.6% carbon, 1.6% hydrogen, 42.0% chlorine, and 4% nitrogen.

EXAMPLE 7

A styrene soluble terpolymer was prepared in the following manner:

500 milliliters of pre-distilled styrene were dissolved in oxygen-free dioxane. In this mixture there was dissolved 0.1 mole of chlorendic anhydride and 0.1 mole of maleic anhydride. One mole of ethylene imine was then stirred in gradually and allowed to completely react. The reaction mixture was stirred until the temperature was reduced to 40°C. and then the solution was separated from dioxane solvent by pouring into water. The styrene layer containing resin in solution was water washed successively to give a styrene soluble terpolymer.

EXAMPLE 8

One mole each of tetrahydrophthalic acid of the formula:

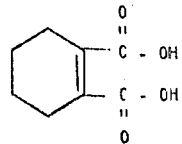

and ethylene imine were reacted in the same manner as in Example 2 to obtain a solid polymer.

EXAMPLE 9

One mole each of hexahydrophthalic anhydride and ethylene imine were reacted in the same manner as in Example 2 to obtain a solid polymer.

EXAMPLES 10-12

One mole of dihydrophthalic acid having $\alpha,\beta$-unsaturation relative to at least one carboxyl group was reacted in turn with one mole of ethylene imine in accordance with the procedure of Example 2 to produce solid polymers. Starting material acids were of the structure:

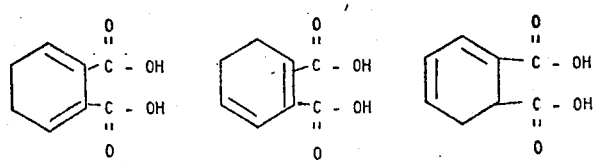

EXAMPLE 13

One mole each of phthalic anhydride and azetidine were reacted in the same manner as in Example 2 to give a solid polymer.

EXAMPLE 14

One mole each of succinic anhydride and aziridine were reacted in the same manner as in Example 2 to give a solid polymer.

EXAMPLE 15

One mole each of maleic acid and aziridine were reacted in the same manner as in Example 2 to give a solid polymer.

EXAMPLE 16

One mole of maleic acid, was combined with one-half mole of ethylene imine and one-half mole of ethylene oxide in a suitable reaction flask equipped with a gas inlet. The reaction was carried out in essentially the same way as described in Examples 1-4.

EXAMPLE 17

One mole of normal butyl maleate was reacted with one-half mole of ethylene imine and one-half mole of propylene oxide in a suitable reaction flask equipped with a gas inlet. The reaction was carried out in essentially the same way as described in Examples 1-4 to produce a white solid polymer.

EXAMPLE 18

One quarter mole each of tetrabromophthalic anhydride and ethylene imine were reacted in the same manner as in Example 2 to give a solid polyester-amide polymer having by analysis, 24.1% carbon, 6.4% hydrogen, 61.1% bromine, and 2.7% nitrogen. (calculated 23,69 C, 9.87 H, 63.09 Br, 2.76 N.)

EXAMPLE 19

Using the solid polymer of Example 18, 40 grams of polyesteramide polymer were mixed with 160 grams of a terpolymer of acrylonitrile and styrene with polybutadiene by an extrusion melt blending process in a Brabender extruder. The extrudate was then air cooled and pelletized for injecting molding using a one ounce plunger type injection molder to produce bar moldings of the following dimensions: 5 × ½ × ⅛ inches. Test results on these moldings are shown in the following Table A.

EXAMPLE 20

One quarter mole each of chlorendic anhydride and ethylene imine were reacted in the same manner as Example 2 to give a solid polymer having a molecular weight of 2070 and by analysis 33.5% carbon, 2.0% hydrogen, 47.0% chlorine, and 3.1% nitrogen. (Calculated 31.92C, 1.69 H, 51.41 Cl, 3.38 N.)

EXAMPLE 21

Using the solid polymer of Example 20, 57 grams were mixed in the same manner as in Example 19 with 155 grams of a terpolymer of polybutadiene with acrylonitrile and styrene together with 14 grams titanium dioxide (Grade R-900), 16 grams antimony trioxide (Thermoguard S), 2 grams magnesium stearate, 5 grams zinc oxide (Kadox 15), and stabilizers in the following amounts: 2 grams Thermolite T-24, and 2 grams Santowhite (dialkyl phenolsulfide). Test results on injection moldings made as described in Example 19 are shown in the following table A.

EXAMPLES 22 and 23

Using the solid polymer of Example 18, 40 grams of polyesteramide polymer were mixed alternately with 160 grams of a high impact grade of polystyrene and polypropylene following the procedures of Example 19 to produce fire retardant polymer compositions.

EXAMPLES 24 and 25

Forty parts of the polyester-amide polymer of Example 18 were mixed respectively with 160 parts of a general purpose polyester resin of the orthophthalic type (made by reacting propylene glycol, phthalic anhydride, and maleic anhydride and dissolved in styrene monomer) or with 160 parts of an epoxy resin (Araldite 6020 made by Ciba Corporation) together with 18 parts of diethylene triamine curing agent. The polymer of Example 18 was mixed into the polyester or the epoxy resin together with curing agent by use of a mortar and pestle. Moldings of the polyester combination were made and cured 16 hours at 50° C. and additionally 24 hours at 120° C. Moldings of the epoxy composition were made and cured 16 hours at 120° C. Fire retardant polymer compositions were obtained.

TABLE A

| Physical properties of flame retardant ABS Resins | | |
|---|---|---|
| | Example 19 | Example 21 |
| Tensile strength (psi) | | |
| Yield | 5410 | 5370 |
| Break | 4770 | 4590 |
| Flexural strength (psi) | | |
| Yield | 9950 | 9410 |
| Modulus × $10^{-5}$ | 3.509 | 3.314 |
| Izod Impact (ft. lbs.) | | |
| Sprue | 5.35 | 7.32 |
| Vent | 3.41 | 4.24 |
| Average | 4.38 | 5.78 |
| Heat deflection (°C) (265 psi) | 72.5 | 67.3 |
| Flammability | | |
| Underwriters Laboratory UL-94 Test Method (passes/trial) | 10/10 | 9/10 |

EXAMPLES 26 and 27

Forty grams of the solid polymer of Example 18 were mixed alternately with 160 grams of a styrene-butadiene rubber (Ameripol 1500, manufactured by B. F. Goodrich Company) or 160 grams of a butyl rubber (Enjoy 218 made by Enjoy Company). Mixing was accomplished on a two-roll mill. A homogeneous sheet was produced from which moldings were made. Fire retardant polymer compositions were obtained.

Although specific examples of the invention have been set forth hereinabove, it is not intended to limit the invention thereto but to include the variations and modifications of the invention.

What is claimed is:

1. A polyester polyamide produced in a process, wherein the reaction medium is a non-polar solvent, by reacting (1) an aziridine monomer, (2) an organic oxide of the formula:

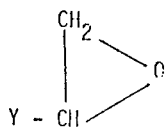

where Y is hydrogen or a monovalent, saturated or unsaturated, alkylene, aromatic, bicyclic or heterocyclic group of 1 to 18 carbon atoms, and (3) an organic (a) anhydride, or (b) dicarboxylic acid of the formula:

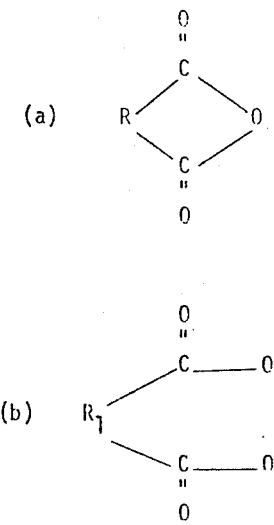

wherein R is a saturated or unsaturated, aromatic, aliphatic, alicyclic, or bicyclic divalent group having 2–18 carbon atoms; if aromatic or alicyclic, 6–18 carbon atoms; if aliphatic, 2–18 carbon atoms; if bicyclic, 7–18 carbon atoms; where $R_1$ is alpha, beta-ethylenically unsaturated aromatic, aliphatic, alicyclic or bicyclic divalent groups of 2–20 carbon atoms; if aromatic or alicyclic, 6–18 carbon atoms; if aliphatic, 2–18 carbon atoms; and if bicyclic, 12–18 carbon atoms.

2. The product of claim 1 produced in a continuous process.

3. A polyester polyamide produced in a process, wherein the reaction medium is a non-polar solvent, by reacting (1) an aziridine monomer, (2) an organic oxide of the formula:

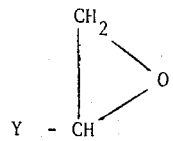

where Y is hydrogen or a monovalent, saturated or unsaturated, alkylene, aromatic, bicyclic or heterocyclic group of 1 to 18 carbon atoms, and (3) an organic anhydride selected from the group consisting of maleic anhydride and phthalic anhydride.

4. The polymer of claim 3 wherein said organic anhydride is phthalic anhydride, said aziridine monomer is ethylene imine and said organic oxide is ethylene oxide.

5. A polyester polyamide produced in a process, wherein the reaction medium is a non-polar solvent, by reacting (1) an aziridine monomer, (2) an organic oxide of the formula:

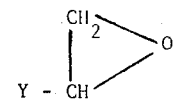

wherein Y is hydrogen or a monovalent saturated or unsaturated alkylene group of 1 to 18 carbon atoms and (3) and $\alpha,\beta$-unsaturated dicarboxylic acid or anhydride of the formula:

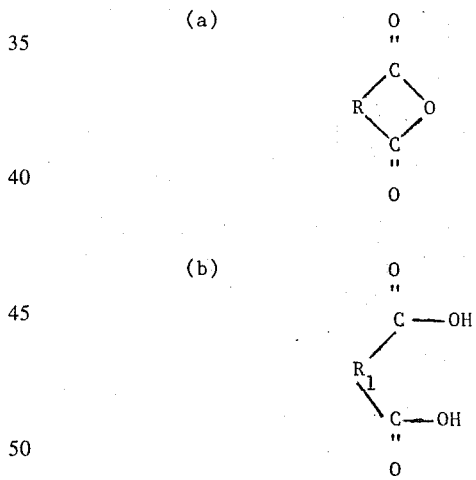

wherein R is an unsaturated, aromatic, aliphatic, alicyclic, or bicyclic divalent group having 2–18 carbon atoms; if aromatic or alicyclic, 6–18 carbon atoms, if aliphatic, 2–18 carbon atoms; if bicyclic, 7–18 carbon atoms; where $R_1$ is alpha, beta-ethylenically unsaturated aromatic, aliphatic, alicyclic or bicyclic divalent groups of 2–20 carbon atoms; if aromatic or alicyclic, 6–18 carbon atoms; if aliphatic, 2–18 carbon atoms; and if bicyclic, 12–18 carbon atoms.

6. The polymer of claim 5 wherein said unsaturated dicarboxylic acid is maleic acid, said aziridine monomer is ethylene imine and said organic oxide is ethylene oxide.

* * * * *

UNITED STATES PATENT OFFICE
CERTIFICATE OF CORRECTION

PATENT NO. : 3,865,792
DATED : February 11, 1975
INVENTOR(S) : Sung Ki Lee

It is certified that error appears in the above-identified patent and that said Letters Patent are hereby corrected as shown below:

At Column 4, line 46, for "0-16" read "0-6".

Signed and sealed this 17th day of June 1975.

(SEAL)
Attest:

RUTH C. MASON
Attesting Officer

C. MARSHALL DANN
Commissioner of Patents
and Trademarks